United States Patent [19]

Kester

[11] 4,342,467
[45] Aug. 3, 1982

[54] CART FOR VEHICLE WITH SINGLE REAR WHEEL

[76] Inventor: William W. Kester, 2385-B Keller Dr., Charleston, S.C. 29404

[21] Appl. No.: 154,793

[22] Filed: May 30, 1980

[51] Int. Cl.³ .......................................... B62K 27/00
[52] U.S. Cl. ................................. 280/204; 280/475; 280/515; 296/37.14
[58] Field of Search ................... 296/37.14; 280/204, 280/651, 652, 656, 47.13 R, 47.26, 63, 72, 79.2, 504, 511, 475

[56] References Cited

U.S. PATENT DOCUMENTS

| | | | |
|---|---|---|---|
| 762,747 | 6/1904 | Notbohm | 280/47.26 |
| 1,239,498 | 9/1917 | Madigan | 280/47.16 |
| 1,771,813 | 7/1930 | Norman | 296/37.14 X |
| 2,750,206 | 6/1956 | Sabato | 280/204 |
| 3,012,796 | 12/1961 | Mieding | 280/504 X |
| 3,841,663 | 10/1974 | Proffit | 280/475 |
| 3,873,127 | 3/1975 | McNichol et al. | 280/202 |
| 3,999,777 | 12/1976 | McGrath | 280/204 |
| 4,037,853 | 7/1977 | Sparks | 280/204 |
| 4,077,645 | 3/1978 | Dortch | 280/511 X |
| 4,077,646 | 3/1978 | Watkins | 280/511 X |
| 4,170,120 | 11/1979 | Freeman | 280/511 X |

*Primary Examiner*—Joseph F. Peters, Jr.
*Assistant Examiner*—Mitchell J. Hill
*Attorney, Agent, or Firm*—Larry Harold Kline

[57] ABSTRACT

A device is disclosed which is securable to a vehicle with a single rear wheel comprising a cart which is ground-engaging, an attachment device securing the cart to the vehicle with a single rear wheel at a point above the single rear wheel, and a cart framework within the cart which is positioned above the center of gravity of the cart.

15 Claims, 10 Drawing Figures

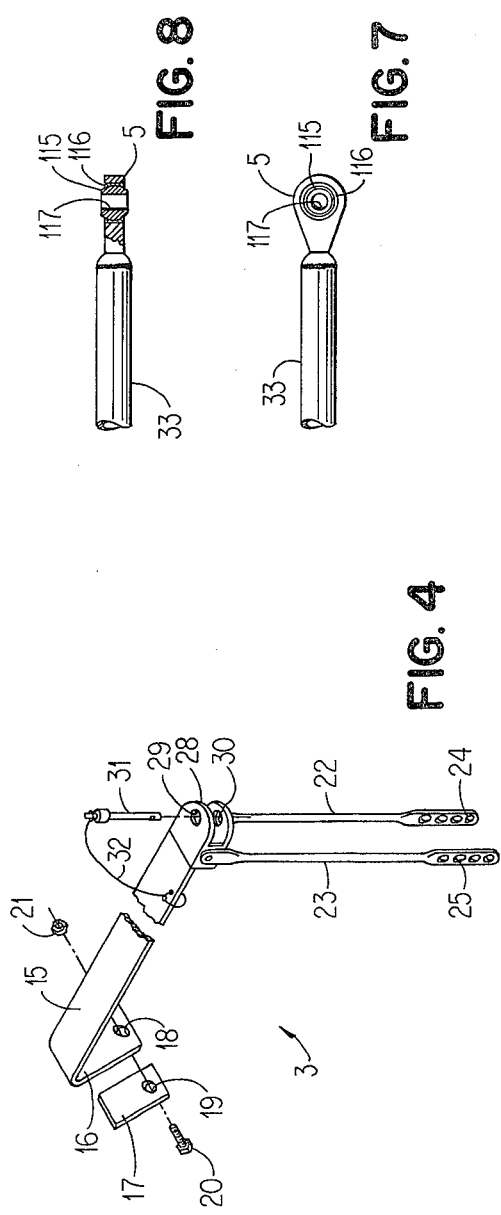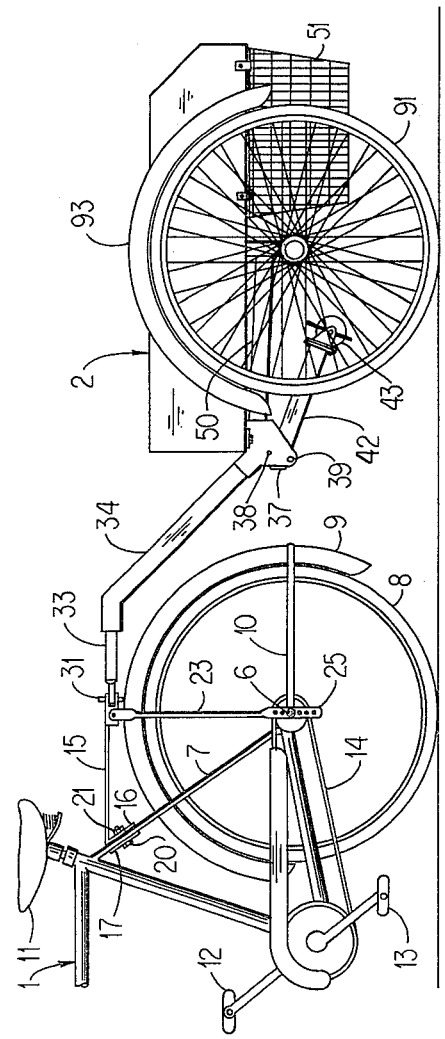

CART FOR VEHICLE WITH SINGLE REAR WHEEL

This invention relates to a cart means and, more particularly, to a cart means that can be utilized behind a vehicle with a single rear wheel.

With the energy shortage, more people are turning toward transportation alternatives rather than the use of an energy consuming engine. The present invention is a cart means that is secured to the rear of a vehicle with a single rear wheel. This cart means can be used for transporting goods, or other desired purposes, utilizng the relatively inexpensive vehicle with a single rear wheel. The invention may be utilized with a bicycle or with a vehicle which does not have an engine, such as a motorcycle or a motorbike.

An object of the present invention is to provide a cart means that can carry a load while secured to a vehicle with a single rear wheel.

Another object of this invention is to provide a cart means that can be connected to a vehicle with a single rear wheel and not impair the turning or riding capabilities of the vehicle.

Another object of this invention is to provide a cart means which can be secured to a vehicle with a single rear wheel or can be utilized as a self-standing cart without the vehicle.

Another object of this invention is to provide a cart means with independent wheel axles.

Still another object of this invention is to provide a cart means secured to a vehicle with a single rear wheel at a point above the center point of the axle of the vehicle with a single rear wheel.

A further object of this invention is to provide a cart means with a cart framework positioned above the center of gravity of the cart means.

Another object of this invention is to provide a basket associated with the cart means, the basket having a hinged lid which also serves as flooring for the cart means.

Another object of this invention is to provide a combination tailgate and locking device which can serve as a tailgate for the cart means and serve as a locking device for the hinged basket lid.

A further object of this invention is to provide optional railing to aid in holding large items within the perimeter of the cart means.

A further object of this invention is to provide a cart means with two wheels and a third wheel which may be utilized or not utilized, as desired.

These and other objects and features of the invention will be apparent from the following description and appended claims.

Briefly, the invention is a device securable to a vehicle with a single rear wheel comprising a cart means which is ground-engaging and which is securable to the vehicle with a single rear wheel. An attachment means is secured to the vehicle with a single rear wheel and is securable to the cart means at a point above the single rear wheel of the vehicle. A cart framework within the cart means is positioned above the center of gravity of the cart means. The cart means comprises a cart framework positioned above the center of gravity of the cart means and two independent wheel systems, each of which is ground-engaging. The cart framework is secured to the two independent wheel systems. The cart means further comprises a floor section secured above the cart framework. A basket is secured below the floor section. The floor section comprises a fixed floor section and a moveable floor section which is hingedly attached to the fixed floor section. The moveable floor section operates also as a lid for the basket. The cart means further comprises a third wheel system which includes a stabilizing wheel which is usable or retractable. The third wheel system comprises a stabilizing wheel securing means secured to the cart framework. A wheel arm is pivotably secured to the stabilizing wheel securing means. The stabilizing wheel, which is ground-engaging when utilized, is secured to the wheel arm. The stabilizing wheel securing means comprises plate means which is secured to the cart framework. Pivot means is within the stabilizing wheel securing means. The pivot means is operative to secure the wheel arm pivotably to the stabilizing wheel securing means. A stop is secured onto the stabilizing wheel securing means. The stop prevents undesired movement of the wheel arm. A locking means, including openings in the plate means and the wheel arm, is operative to secure the stabilizing wheel in a ground-engaging position or in a retractable position. The two indepedent wheel systems each comprise a axle housing secured to the cart framework, an axle, and a wheel secured to the axle. A plurality of bearings is pressed onto the axle and into the axle housing. Axle securing means is attached to the axle on the side of the axle housing opposite from the side of the axle housing where the axle protrudes to be secured to the wheel. A plurality of panel sections may be secured onto the cart means. The plurality of panel sections may include a front panel section and two side panel sections. A plurality of railing supports may be attached to the front panel section and the two side panel sections. A railing with a plurality of railing posts may be secured onto the plurality of panel sections. Each of the plurality of railing posts is secured within one of the plurality of railing supports, in order to secure the railing onto the plurality of panel sections. A tailgate mechanism may be privotably secured to the cart means and be operative to be opened or closed as desired. The tailgate mechanism may further comprise basket locking means which is operative to secure the lid for the basket. A plurality of tailgate railing supports may be secured onto the tailgate mechanism. The railing may comprise a rail extension with a plurality of tailgate railing posts. Each one of the plurality of tailgate railing posts is secured within one of the plurality of tailgate railing supports. The attachment means comprises a plurality of vertical support means secured to the axle of the single rear wheel. A securing section is secured to the plurality of vertical supports and is rigidly secured to the framework of the vehicle with a single rear wheel. Pin means is operative to secure the securing section to the cart means. Cart attachment means is rigidly secured to the cart means and comprises a swivel connector. When the cart means is pulled behind the vehicle with a single rear wheel, the swivel connector will allow the movement of the vehicle with a single rear wheel to minimally effect the movement of the cart means. The pin means is operative to secure the securing section to the swivel connector.

The invention will be more fully understood from the following detailed description and appended claims when taken with the drawings in which:

FIG. 1 is a side elevational view of the cart 2 connected to the bicycle 1 showing the rear section of bicycle 1 only.

FIG. 4 is an exploded isometric view of attachment means 3.

Figure 5:
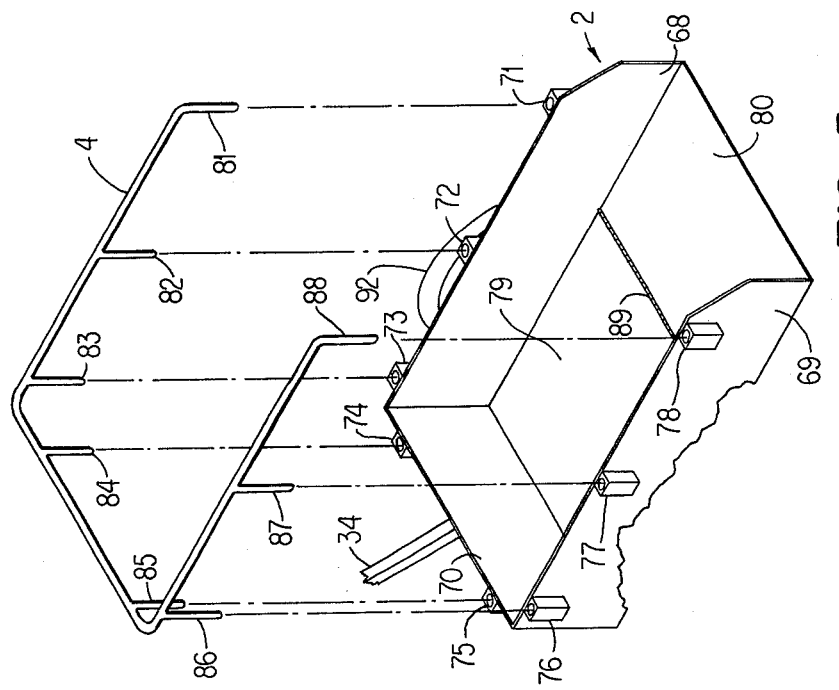

FIG. 5 is a partial isometric view of the cart 2 with railing 4 exploded from the cart 2.

Figure 6:
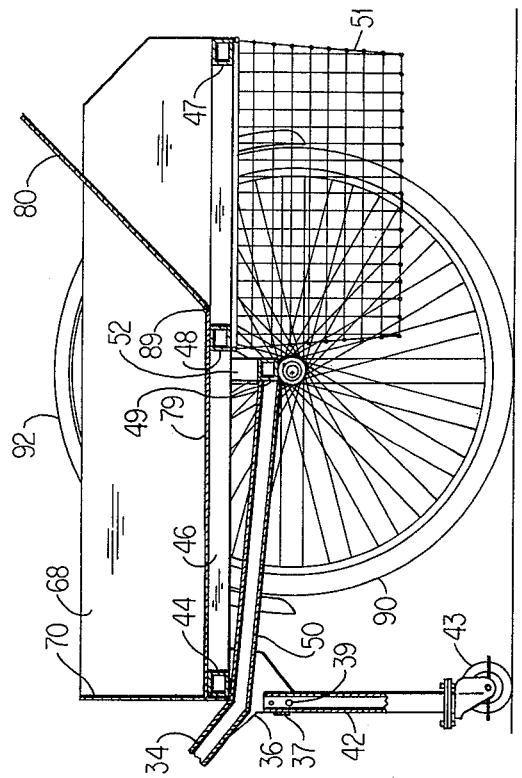

FIG. 6 is a longitudinal section view of cart 2.

FIG. 7 is an enlarged partial view of securing means 5 and grip extension 33 which is secured to connecting arm 34.

FIG. 8 is a partial sectional view of securing means 5.

Figure 9:
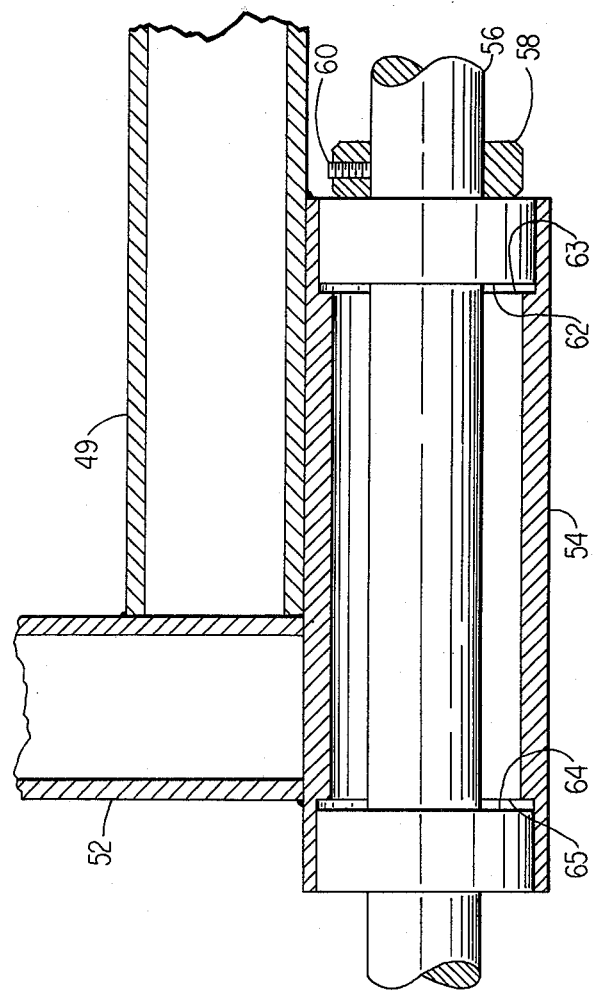

FIG. 9 is an enlarged partial sectional view of right axle housing 54.

Figure 10:
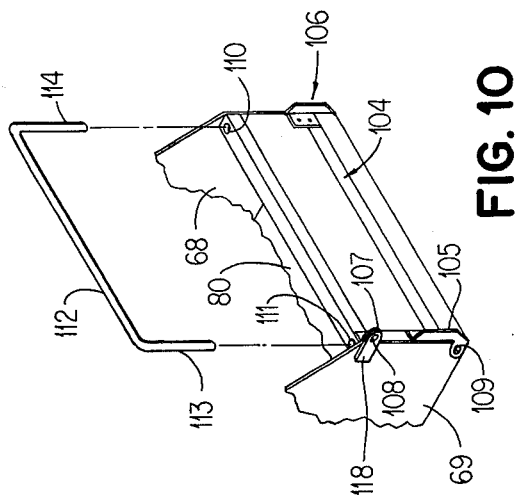

FIG. 10 is a partial isometric view of cart 2 showing the combination tailgate and locking device 104.

Referring now to the drawings, FIG. 1 is a side elevational view of the cart 2 connected to the bicycle 1 showing the rear section of the bicycle 1 only. The invention may be utilized with a bicycle, motorcyle, or any vehicle with a single rear wheel. The cart 2 is attached to the bicycle 1 by attachment means 3.

Figure 2:
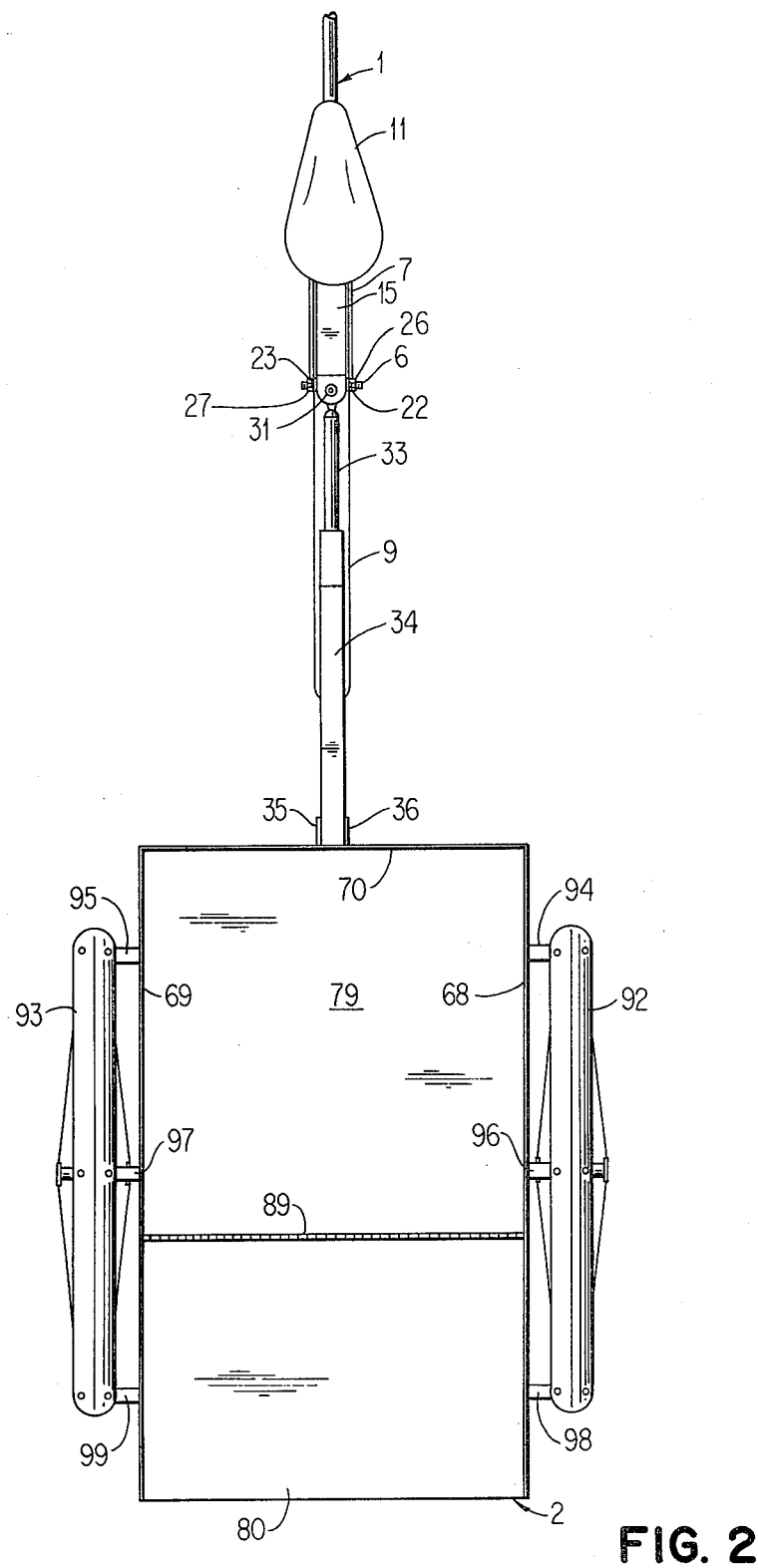
FIG. 2 is a top plan view of the bicycle 1 and the cart 2 shown in FIG. 1

FIG. 2 is a top plan view of the bicycle 1 and the cart 2 shown in FIG. 1.

Figure 3:
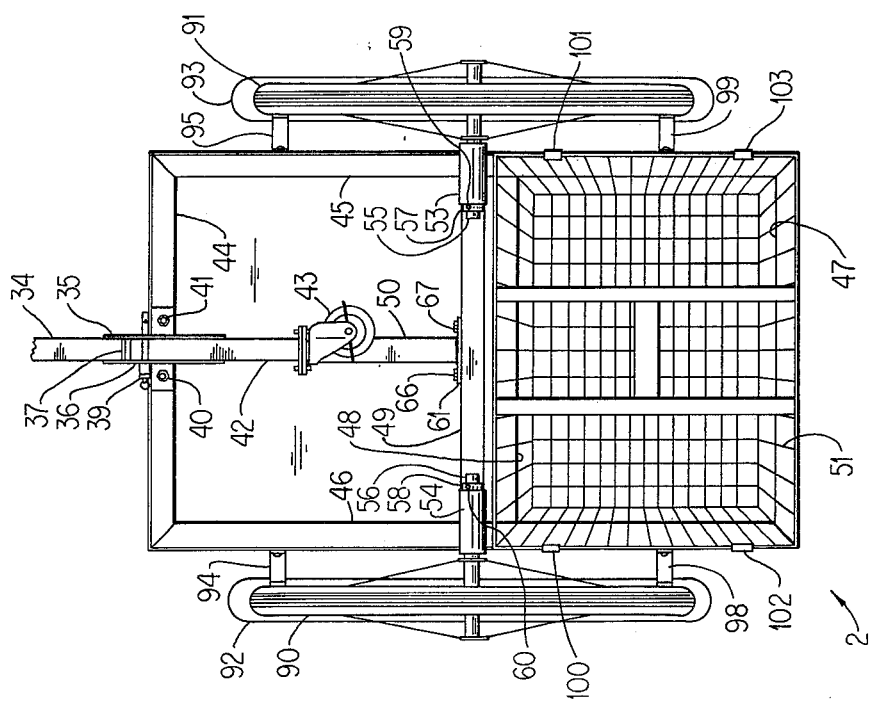
FIG. 3 is a bottom view of the cart 2 with the connecting arm 34 shown partially.

FIG. 3 is a bottom view of cart 2 with the connecting arm 34 shown partially.

FIG. 4 is an exploded isometric view of attachment means 3, which is seen in FIG. 1 and FIG. 4. The attachment means 3 is secured to bicycle 1. Bicycle 1 has a bicycle seat 11, pedals 12 and 13, and a chain drive mechanism 14. Bicycle 1 has a bicycle axle 6 and a rear frame member 7. Secured to the bicycle axle 6 is a rear bicycle tire 8 with rear bicycle tire fender 9. Shown in FIG. 1 is a left rear bicycle tire fender support 10 with the right rear bicycle tire fender support (not shown).

The attachment means 3 has a horizontal bar 15. Frame member connection extension 16 of horizontal bar 15 may be pressed against rear frame member 7 of bicycle 1. Frame member connection backing plate 17 is pressed against the other side of rear frame member 7 of bicycle 1. Frame member connection extension 16 has an opening 18. Frame member connection backing plate 17 has an opening 19.

Bolt 20 may extend through opening 19, through rear frame member 7, and through opening 18 to be secured by nut 21. Frame member connection extension 16 may also be secured to bicycle rear frame member 7 by other securing means, if desired.

Securing section 28 is rigidly secured to horizontal bar 15. Securing section 28 may be formed so that the upper portion of securing section 28 is the end portion of horizontal bar 15. Securing section 28 has a top opening 29 and a bottom opening 30.

Trigger pin 31 may extend through top opening 29, through securing means 5 which is connected to cart 2, and through bottom opening 30, in order to connect the bicycle to the cart 2.

Right vertical support 22 and left vertical support 23 are rigidly secured to securing section 28. Right vertical support 22 has height adjustment holes 24. Left vertical support 23 has height adjustment holes 25. The height adjustment holes 24 and 25 enable the attachment means 3 to be adjusted for different size bicycles. The bicycle axle 6 extends through the desired height adjustment holes 24 and 25. Left securing nut 27 secures the bicycle axle 6 extending through height adjustment holes 25 of left vertical support 23. Right securing nut 26 secures the bicycle axle 6 extending through height adjustment holes 24 of right vertical support 22.

Trigger pin 31 has securing means 32 to attach trigger pin 31 to attachment means 3 so that it will not be lost or misplaced.

Securing means 5 is connected to grip extension 33 which is secured to connecting arm 34. Secured to connecting arm 34 is left plate 35 and right plate 36. Wheel 43 is connected to wheel arm 42. The wheel arm 42 pivots between left plate 35 and right plate 36 at pivot point 38. The wheel arm 42 can be secured in place or can be secured out of the way by securing pin 39. Securing pin 39 slides through openings in left plate 35 and right plate 36, which are shown in FIGS. 1 and 2. When the wheel arm 42 is held in a manner where the wheel 43 is on the ground surface, the securing pin 39 extends through the openings shown in FIGS. 3 and 6 in left plate 35 and right plate 36 and through an opening in wheel arm 42, in order to secure the wheel arm 42 into place. When the wheel 43 is not being utilized, the wheel arm 42 will pivot at pivot point 38 so that the securing pin 39 can be removed and the wheel arm 42 pivoted under the cart 2. The securing pin 39 then can be extended through the openings shown in FIGS. 3 and 6 in left plate 35 and right plate 36 to hold the wheel arm 42 in an out-of-the-way position when the wheel 43 is not being utilized. The wheel arm 42 may be utilized for the cart 2 to be an independent, stable cart. Wheel 43 may be placed in an out-of-the-way position for the cart 2 to be attached to the bicycle 1 and to be pulled by the bicycle 1.

Right bolt 40 secures right plate 36 to floor top frame member 44. Left bolt 41 secures left plate 35 to floor top frame member 44. Stop 37 prevents the wheel arm 42 from extending further away from the cart 2 than is desired. Stop 37 aids, along with securing pin 39, to hold the wheel arm 42 in place when utilizing wheel 43.

Cart 2 has a floor top frame member 44, a top left frame member 45, a top right frame member 46, a top rear frame member 7, and a top center frame member 48. Cart 2 also has a lower frame cross member 49. Frame brace 50 connects the left plate 35 and right plate 36 to lower frame cross member 49. Frame brace 50 has an anchoring plate 61. Anchoring plate 61 is secured to lower frame cross member 49 by bolts 66 and 67. For packaging purposes, bolts 66 and 67 can be removed, along with bolts 40 and 41, to remove the complete connecting arm 34, frame brace 50, and attached pieces from the remainder of the cart 2.

FIG. 5 is a partial isometric view of the cart 2 with railing 4 exploded from cart 2. The railing 4 is an optional attachment for cart 2. Railing 4 has railing posts 81, 82, 83, 84, 85, 86, 87, and 88. A plurality of railing supports 71, 72, 73, 74, 75, 76, 77, and 78 are attached to the cart 2. When the railing 4 is attached to the cart 2, railing post 81 secures into railing support 71; railing post 82 secures into railing support 72; railing post 83 secures into railing support 73; railing post 84 secures into railing support 74; railing post 85 secures into railing support 75; railing post 86 secures into railing support 76; railing post 87 secures into railing support 77; and railing post 88 secures into railing support 78.

Cart 2 has a floor section 79 connected to hinge 89 to basket lid 80. Basket lid 80 is over the basket 51. Cart 2 has a right panel 68, a left panel 69, and a front panel 70. Railing support 71, 72, and 73 are secured to right panel 68. Railing supports 74 and 75 are secured to front panel 70. Railing supports 76, 77, and 78 are secured to left panel 69.

FIG. 6 is a longitudinal sectional view of cart 2. In FIG. 6, wheel 43 is shown in a position to be utilized to stabilize the cart 2. As shown in the prior drawings, cart 2 has a left axle housing 53 secured to lower frame cross member 49. Left axle housing 53 is also secured to left vertical frame member (not shown). Right axle housing 54 is secured to right vertical frame member 52 and lower frame cross member 49. Left axle 55 extends from left axle housing 53. Right axle 56 extends from right axle housing 54. Left securing collar 57 keeps the left axle 55 from disengaging from left axle housing 53. Right securing collar 58 keeps right axle 56 from disengaging from right axle housing 54. Left securing collar 57 has a left set screw 59. Right securing collar 58 has a right set screw 60.

FIG. 7 is an enlarged partial view of securing means 5 and grip extension 33 which is secured to connecting arm 34. Securing means 5 comprises a swivel connection 115 held securely by a collar 116. Collar 116 may be mechanically pressed into securing means 5. Securing means 5 has an opening 117 through which trigger pin 31 may extend to connect cart 2 to bicycle 1. By utilizing a swivel connection 115, the cart 2 remains even more stable when the bicycle 1 is negotiating turns or unlevel surfaces. The swivel connection 115 allows the cart 2 to have varied movements behind the bicycle 1.

FIG. 8 is a partial sectional view of securing means 5 further showing the structure of securing means 5.

FIG. 9 is an enlarged partial sectional view of right axle housing 54. Right axle housing 54 has a right inner axle bearing 62 and a right outer axle bearing 64. A bored section 63 provides room for right inner axle bearing 62 to be pressed into right axle housing 54.

A bored section 65 provides room for right outer axle bearing 65 to be pressed into right axle housing 54. Right inner axle bearing 62 is pressed into bored section 63 of axle housing 54. Right outer axle bearing 64 is pressed into bored section 65 of axle housing 54. Right inner axle bearing 62 and right outer axle bearing 64 are pressed onto right axle 56.

Right securing collar 58 secures onto right axle 56. Right set screw 60 secures right securing collar 58.

As seen in FIG. 3, the right axle 56 and left axle 55 are independent of each other. Therefore, the cart 2 may smoothly make turns and movements utilizing the independent axles 55 and 56.

FIG. 3 also shows the securing clips for basket 51. Basket 51 is secured by right basket securing clips 100 and 102 and left basket securing clips 101 and 103.

FIG. 10 shows a partial isometric view of cart 2 showing a combination tailgate and locking device 104. Combination tailgate and locking device 104 may be added to cart 2. Combination tailgate and locking device 104 has a left pivot bracket 105 with left pivot means 109. Combination tailgate and locking device 104 has a right pivot bracket 106 with a right pivot means (not shown).

Tailgate locking extension 107 may be added to the combination tailgate and locking device 104. A panel locking extension 118 may be secured to left panel 69 in any desired manner. A lock may be placed through opening 108 in panel locking extension 118 and through an opening in locking extension 107 (not shown).

The combination tailgate and locking device 104 may have right railing support opening 110 and left railing support opening 111. A railing extension 112 may be utilized to provide the railing entirely around the cart 2. Railing extension 112 has a left railing post 113 and a right railing post 114. Left railing post 113 is secured into left railing support opening 111 and right railing post 114 is secured into right railing support opening 110. The railing 4 and the railing extension 112 may have any plurality of desired railing posts. For every railing post, an appropriate railing support would be placed around the perimeter of the cart 2.

As seen in the figures, cart 2 has a right cart wheel 90 and a left cart wheel 91. Right cart wheel 90 has a right cart fender 92 and right cart fender supports 94, 96, and 98. Left cart wheel 91 has a left cart fender 93 and left cart fender supports 95, 97, and 99. The right cart fender supports 94, 96, and 98 are secured to right panel 68. The left cart fender supports 95, 97, and 99 are secured to left panel 69.

The invention meets the objects of this invention. The invention provides a cart means that can carry a load while secured to a vehicle with a single rear wheel. The invention provides a cart means that can be connected to a vehicle with a single rear wheel and not impair the turning or riding capabilities of the vehicle. The invention provides a cart means which can be secured to a vehicle with a single rear wheel or can be utilized as a self-standing cart without the vehicle. The invention provides a cart means with independent wheel axles. The invention provides a cart means secured to a vehicle with a single rear wheel at a point above the center point of the axle of the vehicle with a single rear wheel. This invention provides a cart means with the cart framework positioned above the center of gravity of the cart means. This invention provides a basket associated with the cart means, the basket having a hinged lid which also serves as flooring for the cart means. This invention provides a combination tailgate and locking device which can serve as a tailgate for the cart means and serve as a locking device for the hinged basket lid. This invention provides optional railing to aid in holding large items within the perimeter of the cart means. This invention provides a cart means with two wheels and a third wheel which may be utilized or not utilized, as desired.

This invention enables a bicycle to carry additional loads without causing an additional load to the bicycle. The cart means can carry a heavy load trailing a bicycle without causing a comparative additional load on the bicycle. The cart is designed to follow the bicycle around corners and up and down hills without causing any impaired turning of the bicycle. The cart means has a single handle to use while loading or unloading the cart and moving it to the bicycle. The cart means has independent wheels. The frame of the cart means is stabilized above the center point of the axles of the cart means. The cart has a floor with a hinged lid as part of the floor. The hinged lid may be opened for access to the basket. The cart may have a tailgate. The cart may also have a tailgate that is also hinged and can be utilized as a lock for the basket lid. The cart has fenders to keep foreign objects from interferring with the cart. The cart has panels around the perimeter of the cart and optional side rails to hold large items in the cart.

The pivot point of the securing means 5 for the cart may be attached over the single rear wheel of the bicycle, over the center point of the axle for the rear wheel. The cart framework is designed to be positioned above the center of gravity of the cart. By being above the center of gravity of the cart, the cart framework is able to carry a heavier load with less resistance and drag on the vehicle with a single rear wheel pulling it. This provides for a better weight distribution and an ease of handling for the vehicle with a single rear wheel.

The present invention is better for carrying loads than a bicycle with a basket. A bicycle with a basket carrying a load has an additional weight on the bicycle. The additional weight interferes with the turning ability of the bicycle and the stability of the bicycle.

The bicycle is not self-standing, while the present invention may be self-standing. Utilizing the present invention, the bicycle can bring the cart with the desired load to a certain location and leave the cart and its load while the bicycle is utilized for other transportation or pleasure.

Reflective tape can be placed on the cart, if desired, for utilization of the cart at night. The present invention has many advantages over a three-wheeled bicycle. The present cart means can hold more weight without putting an additional load on the bicycle. The present invention does not have the problem with a turning radius that a three-wheeled bicycle would have. With the present invention, normal bicycle turns can be made.

The cart means has independent wheels and is attached over the rear wheel of the bicycle, allowing the bicycle operator to ride without feeling the true amount of additional weight on the bicycle. The bicycle operator would still have the same turning ability as that of a normal bicycle. The present invention can be utilized with any normal two-wheeled bicycle or any vehicle with a single rear wheel.

The cart means can be utilized for yard work, groceries, as a building aid, or for almost any desired use. The present cart means handles so easily that the cart can be wheeled right into the kitchen to unload groceries. The uses of the present invention are virtually limited only by the uses desired in the field of carrying relatively small loads in comparison to an automobile's carrying capability. The present invention enables the job of carrying to be fulfilled with a tremendous potential for energy savings and convenience.

While the invention has been described with reference to specific embodiments, the description is illustrative and is not be be construed as limiting the scope of the invention. Various modifications and changes may occur to those skilled in the art without departing from the spirit and scope of the invention as defined by the appended claims.

I claim:

1. A device securable to a vehicle with a single rear wheel comprising:
   a. cart means which is ground engaging and which is securable to said vehicle with a single rear wheel;
   b. attachment means adjustably secured to said vehicle with a single rear wheel at variable heights above the axle of said single rear wheel depending on the radius of said single rear wheel and securable to said cart means at a point above said single rear wheel of said vehicle;
   c. a cart framework, comprising a floor section within said cart means, said floor section positioned above the center of gravity of said cart means and said floor section positioned above the center of gravity of said single rear wheel;
   d. two independent wheel systems, each of which is ground-engaging, whereby said cart framework is secured to said two independent wheel systems;
   e. an independent axle housing comprising a plurality of bearings secured to said cart framework;
   f. an axle rotatable within said plurality of bearings secured within said axle housing;
   g. a wheel which is ground-engaging and is secured to said axle; and
   h. a basket secured below said floor section and behind each axle housing of said two independent wheel systems.

2. A device according to claim 1 wherein said floor section comprises a fixed floor section and a moveable floor section which is hingedly attached to said fixed floor section and operates as a floor section and as a lid for said basket.

3. A device according to claim 1 wherein said cart means further comprises a third wheel system which includes a stabilizing wheel which is usable or retractable.

4. A device according to claim 3 wherein said third wheel system comprises:
   a. a stabilizing wheel securing means secured to said cart framework;
   b. a wheel arm pivotable secured to said stabilizing wheel securing means; and
   c. a stabilizing wheel which is groundengaging, when utilized, and is secured to said wheel arm.

5. A device according to claim 4 wherein said stabilizing wheel securing means comprises:
   a. plate means secured to said cart framework;
   b. pivot means within said stabilizing wheel securing means operative to secure said wheel arm pivotably to said stabilizing wheel securing means;
   c. a stop secured onto said stabilizing wheel securing means which prevents undesired movement of said wheel arm; and
   d. locking means including openings in said plate means and said wheel arm operative to secure said stabilizing wheel in a ground-engaging position or a retracted position.

6. A device according to claim 1 wherein said two independent wheel systems each further comprises axle securing means attached to said axle on the side of said independent axle housing opposite from the side of said independent axle housing where said axle protrudes to be secured to said wheel.

7. A device according to claim 1 wherein said cart means further comprises a plurality of panel sections including a front panel section and two side panel sections.

8. A device according to claim 7 wherein said cart means further comprises:
   a. a plurality of railing supports attached to said front panel section and said two side panel sections; and
   b. a railing with a plurality of railing posts, each one of said plurality of railing posts securing within one of said plurality of railing supports in order to secure said railing onto said plurality of panel sections.

9. A device according to claim 8 wherein said plurality of panel sections further comprises a tailgate mechanism pivotable secured to said cart means and operative to be opened or closed as desired.

10. A device according to claim 8 wherein said floor section comprises a fixed floor section and a moveable floor section which is hingedly attached to said fixed floor section and operates as a floor section and as a lid for said basket.

11. A device according to claim 10 wherein said tailgate mechanism further comprises a basket locking means operative to secure said lid for said basket.

12. A device according to claim 9 wherein said tailgate mechanism further comprises a plurality of tailgate railing supports and said railing further comprises a rail extension with a plurality of tailgate railing posts, each one of said plurality of tailgate railing posts securing within one of said plurality of tailgate railing supports.

13. A device according to claim 1 wherein said attachments comprises:
   a. a plurality of vertical support means adjustably secured to the axle of said single rear wheel at variable heights above the axle of said single rear wheel depending on the radius of said single rear wheel;
   b. a securing section secured to said plurality of vertical support means and rigidly secured to the framework of said vehicle with a single rear wheel, said framework extending from a point below the seat of said vehicle with said single rear wheel to said axle of said single rear wheel; and
   c. pin means operative to secure said securing section to said cart means allowing for quick connection and disconnection of said vehicle to said cart means by the insertion or removal of said pin means.

14. A device according to claim 13 wherein said cart means comprises cart attachment means rigidly secured to said cart means and comprising a swivel connector; whereby when said cart means is pulled behind said vehicle with a single rear wheel, said swivel connector will allow the movement of said vehicle with a single rear wheel to minimally effect the movement of said cart means.

15. A device according to claim 2 wherein said cart means further comprises a third wheel system which includes a stabilizing wheel which is usable or retractable.

* * * * *